United States Patent
Yonekawa et al.

(10) Patent No.: US 10,872,247 B2
(45) Date of Patent: Dec. 22, 2020

(54) IMAGE FEATURE EMPHASIS DEVICE, ROAD SURFACE FEATURE ANALYSIS DEVICE, IMAGE FEATURE EMPHASIS METHOD, AND ROAD SURFACE FEATURE ANALYSIS METHOD

(71) Applicants: Kabushiki Kaisha Toshiba, Tokyo (JP); Toshiba Infrastructure Systems & Solutions Corporation, Kanagawa (JP)

(72) Inventors: Yoko Yonekawa, Tokyo (JP); Yuuichi Nakamura, Tokyo (JP); Nobuyuki Kumakura, Kanagawa (JP); Masaki Shiratsuki, Kanagawa (JP); Takahiko Yamazaki, Chiba (JP)

(73) Assignees: Kabushiki Kaisha Toshiba, Tokyo (JP); Toshiba Infrastructure Systems & Solutions Corporation, Kanagawa (JP)

( * ) Notice: Subject to any disclaimer, the term of this patent is extended or adjusted under 35 U.S.C. 154(b) by 46 days.

(21) Appl. No.: 16/165,200

(22) Filed: Oct. 19, 2018

(65) Prior Publication Data

US 2019/0163994 A1    May 30, 2019

(30) Foreign Application Priority Data

Nov. 28, 2017   (JP) .................. 2017-228294

(51) Int. Cl.
*G06K 9/00* (2006.01)
*G06T 7/70* (2017.01)
(Continued)

(52) U.S. Cl.
CPC .......... *G06K 9/00798* (2013.01); *G06T 5/008* (2013.01); *G06T 5/20* (2013.01);
(Continued)

(58) Field of Classification Search
None
See application file for complete search history.

(56) References Cited

U.S. PATENT DOCUMENTS

| 2013/0170701 A1 | 7/2013 | Suzuki et al. |
| 2015/0243169 A1 | 8/2015 | Tani |

(Continued)

FOREIGN PATENT DOCUMENTS

| EP | 3327198 A1 | 5/2018 |
| JP | 2004274431 A | 9/2004 |

(Continued)

OTHER PUBLICATIONS

Yano Koichi, Shadow removal method for pavement damage analysis, IEICE Technical Report, Japan, The Institute of Electronics, Information and Communication Engineers, Feb. 28, 2017, vol. 116 No. 502, p. 7-p. 12.

(Continued)

*Primary Examiner* — Delomia L Gilliard
(74) *Attorney, Agent, or Firm* — Baker Botts L.L.P.

(57) ABSTRACT

According to one embodiment, an image feature emphasis device, a road surface feature analysis device, an image feature emphasis method, and a road surface feature analysis method which can improve the accuracy of detection of features of a road surface in a road surface image are provided. The image feature emphasis device includes a region acquirer and an image feature emphasis processor. The region acquirer acquires a region of a road surface portion from an image that has been captured. The image feature emphasis processor emphasizes a feature of the acquired region of the road surface portion by changing brightness values in the region of the road surface portion on the basis of a maximum brightness value and a minimum brightness value in the region of the road surface portion.

14 Claims, 11 Drawing Sheets

(51) Int. Cl.
*G06T 7/00* (2017.01)
*G06T 5/20* (2006.01)
*G06T 5/00* (2006.01)

(52) U.S. Cl.
CPC .............. *G06T 7/0004* (2013.01); *G06T 7/70* (2017.01); *G06T 2207/20021* (2013.01); *G06T 2207/20032* (2013.01); *G06T 2207/30132* (2013.01); *G06T 2207/30242* (2013.01); *G06T 2207/30256* (2013.01)

(56) References Cited

U.S. PATENT DOCUMENTS

2018/0195973 A1* 7/2018 Yonekawa .............. E01C 23/01
2019/0163994 A1* 5/2019 Yonekawa ................ G06T 5/20

FOREIGN PATENT DOCUMENTS

| | | | |
|---|---|---|---|
| JP | 2007265016 A | * | 10/2007 |
| JP | 2007265016 A | | 10/2007 |
| JP | 2007265016 A | | 11/2007 |
| JP | 2011-039732 A | | 2/2011 |
| JP | 2013-139671 A | | 7/2013 |
| JP | 2014-041460 A | | 3/2014 |
| WO | 2017014288 A1 | | 1/2017 |

OTHER PUBLICATIONS

Office Action issued in related Japanese Patent Application No. 2017-228294 dated Sep. 29, 2020 (with machine translation), 8 pages.

\* cited by examiner

FIG. 11
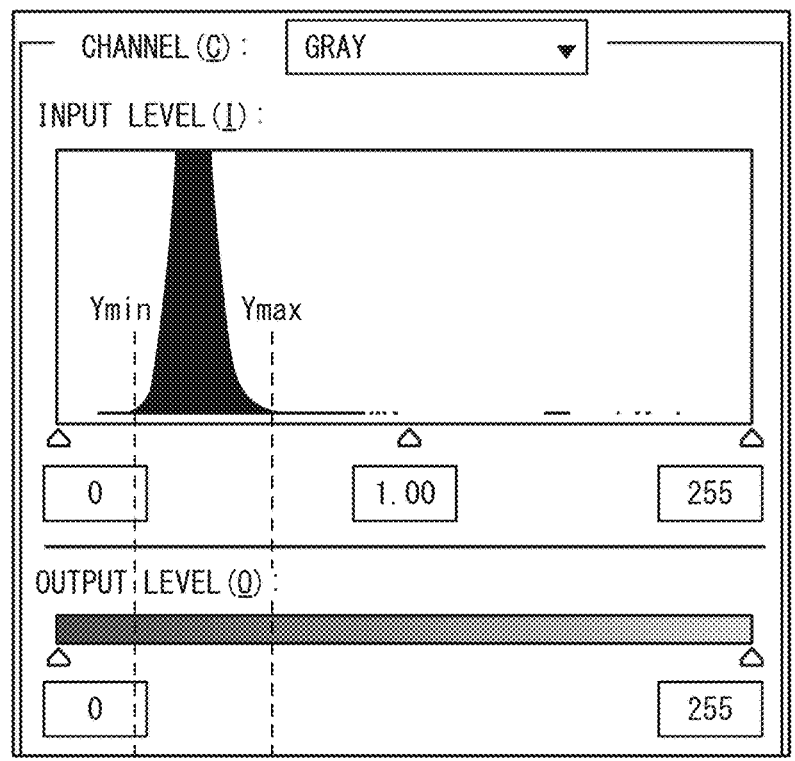
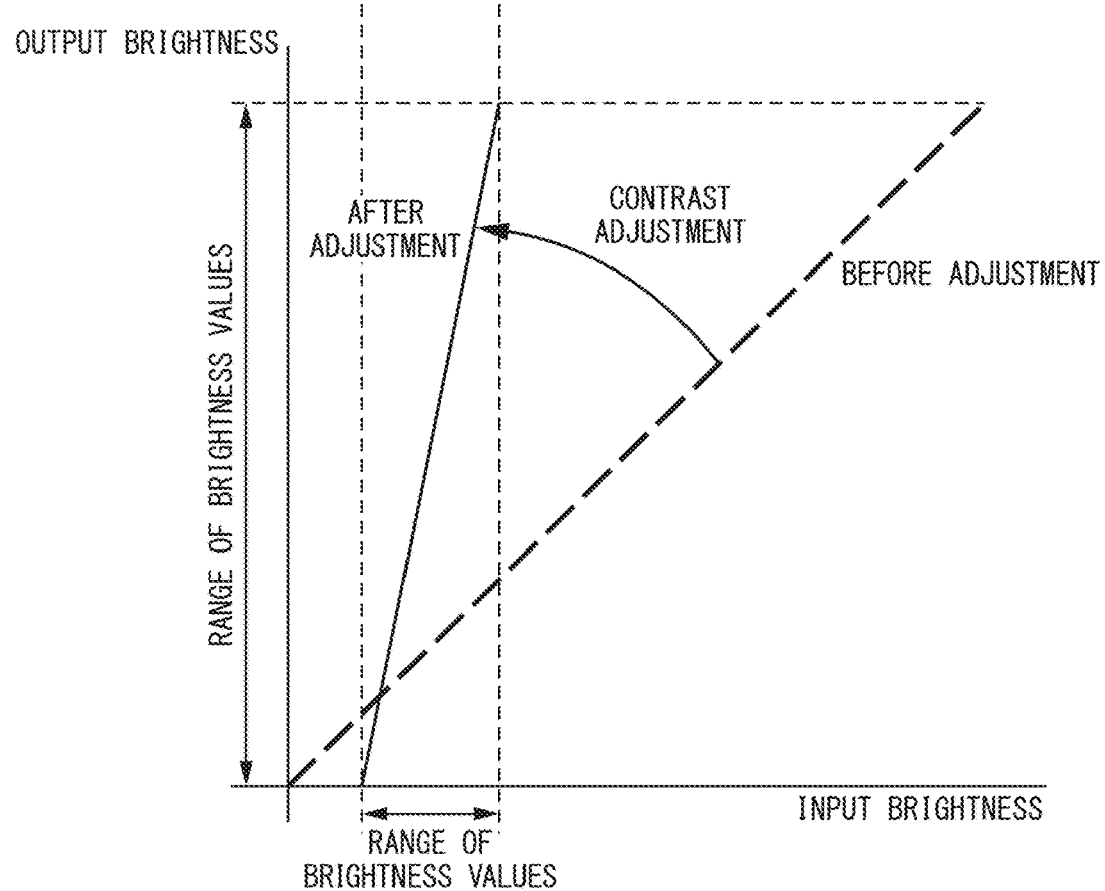

IMAGE FEATURE EMPHASIS DEVICE, ROAD SURFACE FEATURE ANALYSIS DEVICE, IMAGE FEATURE EMPHASIS METHOD, AND ROAD SURFACE FEATURE ANALYSIS METHOD

CROSS-REFERENCE TO RELATED APPLICATION

This application is based upon and claims the benefit of priority from Japanese Patent Application No. 2017-228294 filed on Nov. 28, 2017, and the entire contents of which are incorporated herein by reference.

FIELD

Embodiments described herein relate generally to an image feature emphasis device, a road surface feature analysis device, an image feature emphasis method, and a road surface feature analysis method.

BACKGROUND

In the related art, features of a road surface are detected using a road surface image obtained by imaging a road surface with a visible-light camera. When a dedicated fixed camera is used, it is easy to detect features of a road surface because a road surface image obtained by imaging only the road surface is obtained. However, when a mobile camera such as a portable camera or an in-vehicle camera is used, objects such as moving bodies or trees other than the road surface may be imaged in the road surface image depending on environments around the road. Use of such a road surface image may reduce the accuracy of detection of features of the road surface in the road surface image.

BRIEF DESCRIPTION OF THE DRAWINGS

FIG. 11 is a diagram showing details of contrast adjustment.

DETAILED DESCRIPTION OF THE INVENTION

The present invention provides an image feature emphasis device, a road surface feature analysis device, an image feature emphasis method, and a road surface feature analysis method which can improve the accuracy of detection of features of a road surface in a road surface image.

According to one embodiment, an image feature emphasis device includes a region acquirer and an image feature emphasis processor. The region acquirer is configured to acquire a region of a road surface portion from an image that has been captured. The image feature emphasis processor is configured to emphasize a feature of the acquired region of the road surface portion by changing brightness values in the region of the road surface portion on the basis of a maximum brightness value and a minimum brightness value in the region of the road surface portion.

Hereinafter, an image feature emphasis device, a road surface feature analysis device, an image feature emphasis method, and a road surface feature analysis method according to embodiments will be described with reference to the drawings.

Figure 1:
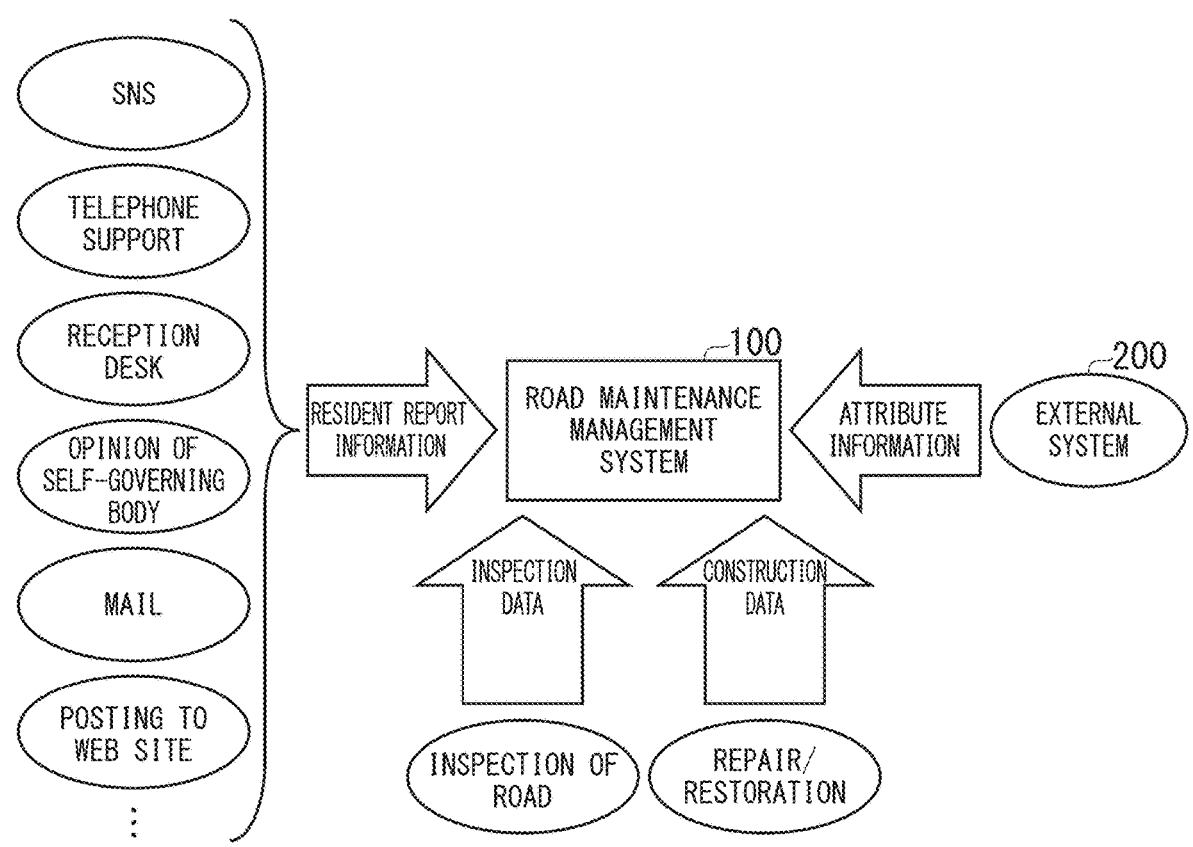
FIG. 1 is a schematic diagram showing an outline of a road maintenance management system.

FIG. 1 is a schematic diagram showing an outline of a road maintenance management system 100.

The road maintenance management system 100 is a system that supports road maintenance managers in maintenance and management operations in work such as repairs or restorations of roads. The roads mentioned here refer to public roads (including general roads and highways) that are managed by road operators or public institutions such as national or local public organizations.

Road IDs, road names, inspection sections (each defined by an inspection start position and an inspection end position), and attribute information of roads to be managed are registered in the road maintenance management system 100 in advance from an external system 200. Then, the road maintenance management system 100 provides inspection information, work information, and information provided by residents as reference information for determining the order of road surface repairs. Thus, the road maintenance management system 100 supports more effective determination of the order in which road repairs are performed.

The attribute information registered from the external system 200 is information indicating attributes of each road such as the width or extension, the position, the paving time, the number of years of service, the usage, and the use frequency of the road.

The inspection information is information indicating the states of pavement obtained by inspection of the roads to be managed. Resident report information is various information or requests regarding roads that are routinely transmitted from residents or the like. The work information is information regarding the situations of work such as repairs or restorations which have been carried out for the roads to be managed or regarding the history of the situations thereof.

Figure 2:
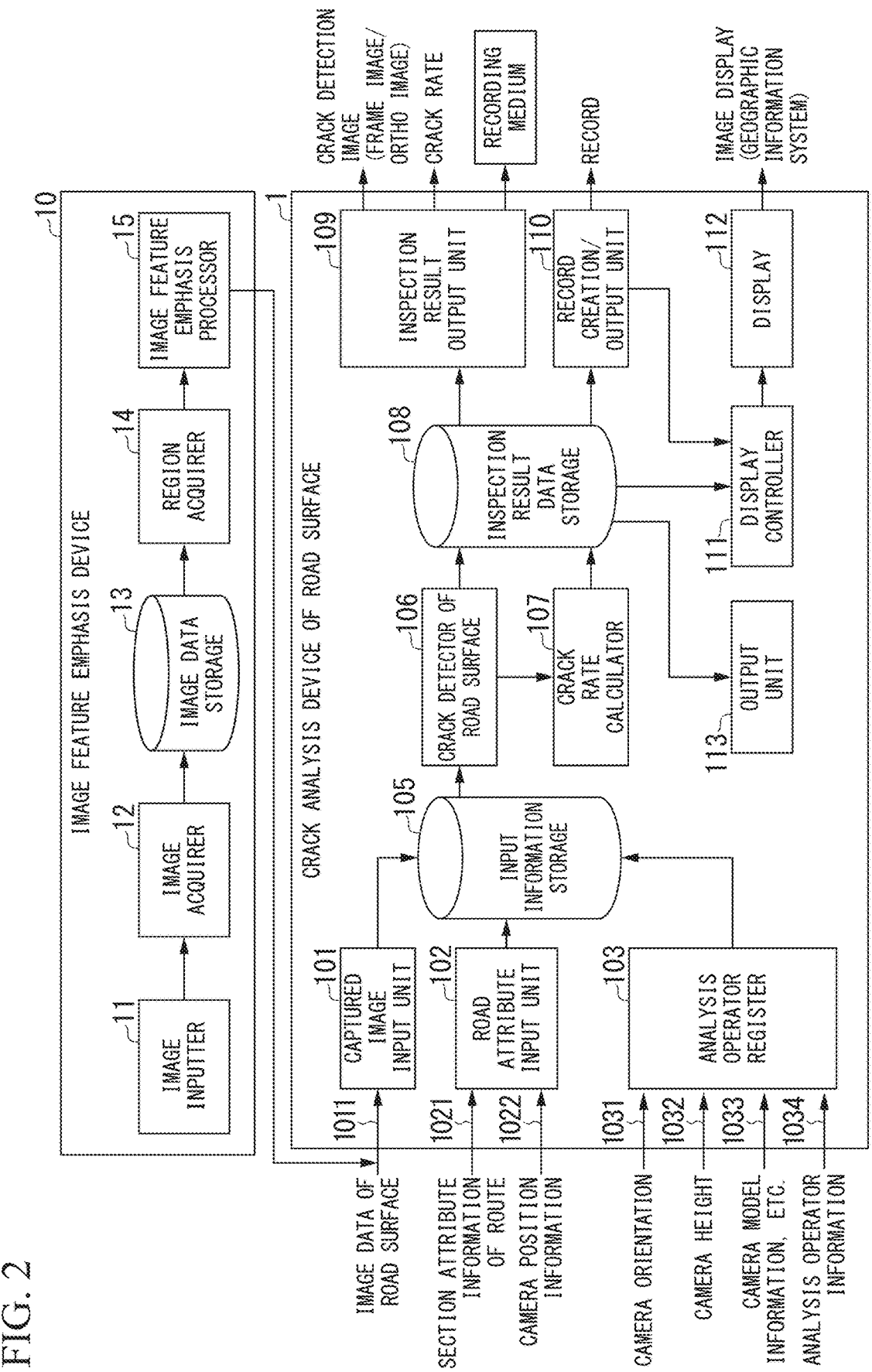
FIG. 2 is a schematic block diagram showing the functional configuration of each device in a first embodiment.

The road maintenance management system 100 includes a crack analysis device of road surface 1 and an image feature emphasis device 10 shown in FIG. 2. The image feature emphasis device 10 is a device that performs a process of emphasizing features of a region(s) of a road surface portion in a road surface image captured by imaging a road surface.

The crack analysis device of road surface 1 is a device that automatically detects pavement cracks from a road surface image captured at the time of inspection of the road surface through image processing and calculates a "crack rate" which is one of indices for evaluating degradation of the pavement.

First Embodiment

First, a first embodiment will be described. In the first embodiment, crack analysis is performed after emphasis processing is performed for a road surface portion in a captured image in advance.

FIG. 2 is a schematic block diagram showing a functional configuration of the first embodiment.

First, the configuration of the image feature emphasis device 10 will be described. The image feature emphasis device 10 is a device that detects a road surface portion from a captured image and performs emphasis processing in advance.

The image feature emphasis device 10 includes a central processing unit (CPU), a memory, an auxiliary storage device, or the like connected through a bus and executes a program. Through execution of the program, the image feature emphasis device 10 functions as a device including an image input unit 11, an image acquirer 12, an image data storage 13, a region acquirer 14, and an image feature emphasis processor 15. All or a part of each function of the image feature emphasis device 10 may be realized using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disc, a ROM, or a CD-ROM, or a storage device such as a hard disk built in a computer system. The program may also be transmitted and received via an electric communication line.

The image input unit 11 is an input unit for inputting a road surface image to the image feature emphasis device 10. Here, a road surface image captured by an in-vehicle camera, a commercially available camera, a camera provided in a smartphone, or the like may be input, a road surface image stored in a storage device such as a magnetic hard disk device or a semiconductor storage device may be input, or a road surface image may be input from the Internet as examples of the method of inputting images.

The road surface image may be an image in which a road surface is imaged over the entirety of the image or an image in which a road surface is imaged in a part of the image and an object (for example, a moving object or a tree) is imaged in a region where no road surface is imaged. The road surface image is, for example, a monochrome image with an image size of full high definition (HD).

The image acquirer 12 is an image acquirer that acquires a road surface image input by the image input unit 11.

The image data storage 13 is a storage that stores the road surface image acquired by the image acquirer 12. The image data storage 13 is configured using a storage device such as a magnetic hard disk device or a semiconductor storage device. The image data storage 13 may also be a nonvolatile memory.

The region acquirer 14 is a region acquirer that generates a partial region image by acquiring a region(s) of a road surface portion from the road surface image stored in the image data storage 13. The method of acquiring the image region will be described later.

The image feature emphasis processor 15 is a processing unit that performs a process of emphasizing features of the region of the road surface portion in the partial region image acquired by the region acquirer 14. The process of emphasizing the features of the region of the road surface portion is contrast enhancement processing which emphasizes the difference in brightness between road surface regions. In the following description, the process of emphasizing the features of the region of the road surface portion is simply referred to as emphasis processing.

It is to be noted that the image feature emphasis device 10 may include at least the region acquirer 14 and the image feature emphasis processor 15.

Next, the configuration of the crack analysis device of road surface 1 will be described. The crack analysis device of road surface 1 is a device that analyzes pavement cracks using an emphasized image generated by the image feature emphasis device 10.

The crack analysis device of road surface 1 includes a captured image input unit 101, a road attribute input unit 102, an analysis operator register 103, an input information storage 105, a crack detector of road surface 106, a crack rate calculator 107, an inspection result data storage 108, an inspection result output unit 109, a record creation/output unit 110, a display controller 111, a display 112, and an output unit 113.

The captured image input unit 101 has a captured image acquirer 1011. The captured image acquirer 1011 is an acquirer that acquires a partial region image in which features of the region of the road surface portion are emphasized (hereinafter referred to as an "emphasized image") from the image feature emphasis device 10. Connection between the captured image acquirer 1011 and the image feature emphasis device 10 may be either wired or wireless. The captured image input unit 101 may also acquire an emphasized image from a storage in which the emphasized image is stored. The captured image input unit 101 stores the acquired emphasized image, which has been input to the captured image input unit 101, in the input information storage 105.

The road attribute input unit 102 has a section attribute information input unit 1021 and a position data acquirer 1022.

The section attribute information input unit 1021 is an input unit for acquiring section attribute information of a route on which a road surface is imaged. The section attribute information is information of attributes defined for each section of the route on which a road surface is imaged.

The information of attributes is information on a "road," a "bridge," a "tunnel," or the like. The section attribute information may include information such as a route name, a section number, a start point of the section, or an end point of the section.

Each route is partitioned into sections corresponding to distances from the start point, and attributes of the section (section attributes) are defined for each section. The section attribute information of the route can be created on a PC or the like (not shown). The section attribute information input unit 1021 may acquire the created section attribute information from the PC or the like connected via a network or may acquire the same via a recording medium.

The position data acquirer 1022 is an acquirer that acquires position data of a camera that has captured the image acquired from the captured image input unit 101. The position data (position information) is, for example, longitude/latitude information acquired from a user receiver of a global positioning system (GPS) (GPS receiver) that is mounted on the vehicle together with the camera. In addition to the longitude/latitude information, the position data may include information such as altitude, speed, or date and time. The position data may be corrected using information on speed or information on acceleration of the vehicle on which the camera is mounted in an intermountain area or a tunnel where radio waves from GPS satellites are difficult to reach.

The analysis operator register 103 has a camera orientation input unit 1031, a camera height input unit 1032, a camera model information input unit 1033, and an analysis operator information input unit 1034.

The camera orientation input unit 1031 is an acquirer that acquires camera orientation information. The orientation of the camera is, for example, an angle of depression of the camera with respect to the road surface or an angle of deviation of the imaging direction with respect to the traveling direction of the vehicle in which the camera is mounted when it is an in-vehicle camera.

The camera height input unit 1032 is an input unit that acquires information on the height of the camera from the road surface. The angle of depression is an angle formed between a horizontal plane having the same height as the camera when the camera images an object located below the horizontal plane and a line of sight in a direction from the camera to the imaged object. The angle of depression of the horizontal direction is 0 degrees. The angle of depression of a direction directly downward from the camera is 90 degrees.

The camera model information input unit 1033 is an input unit for acquiring information such as camera model information. The information such as camera model information may include, for example, information such as the make of the camera, the focal length of the lens of the camera, or the size of an image to be captured.

The analysis operator information input unit 1034 acquires information on an analysis operator who performs analysis work with the crack analysis device of road surface 1. The information on the analysis operator is, for example, the name or identification (ID) of the analysis operator.

The analysis operator register 103 acquires the camera orientation information, the camera height information, the camera model information, and the analysis operator information and stores them in the input information storage 105 as analysis operator registration information.

The present embodiment has been described with reference to the case in which the input unit is divided into the captured image input unit 101, the road attribute input unit 102, and the analysis operator register 103 which acquire their respective information, but they may also be implemented as a single function.

The input information storage 105 is a storage that stores an emphasized image which is a captured image in which a road surface region(s) is emphasized, the road attribute information, and the analysis operator registration information. The input information storage 105 is configured, for example, using a storage device such as a magnetic hard disk device or a semiconductor storage device. The input information storage 105 stores data on the emphasized image acquired by the captured image input unit 101 in association with position data acquired by the position data acquirer 1022. That is, the input information storage 105 stores the data on the emphasized image acquired by the captured image acquirer 1011 in association with position data at the time of imaging.

The crack detector of road surface 106 is a detector that detects a road surface from the region of the road surface portion stored in the input information storage 105 through image processing.

When the camera is an in-vehicle camera, the camera is disposed at a predetermined angle of depression with respect to the road surface and thus the captured image is an image obtained by obliquely imaging the road surface. Therefore, the crack detector of road surface 106 performs orthogonal projection conversion on the emphasized image to convert it into an image of the road surface when viewed from directly above (an ortho image). The crack detector of road surface 106 outputs generated crack shape data, the ortho image, and position data indicating the position of a detected crack on the road surface to the crack rate calculator 107.

The ortho image may also be created by superimposing images created from a plurality of frame images. For example, the crack detector of road surface 106 can generate an ortho image having a wide dynamic range by synthesizing it on the basis of a plurality of frame images captured with changing exposure. The crack detector of road surface 106 may also generate an ortho image on the basis of a plurality of frame images captured at different positions. Generating the ortho image on the basis of a plurality of frame images captured at different positions ensures that the ortho image can be generated on the basis of a successfully captured frame image, for example, even when imaging trouble such as shake has occurred in the frame images due to vibration or the like of the vehicle.

Next, crack shape data is calculated from the generated ortho image. Here, the crack shape data is data indicating the shape of the crack. The data format of the crack shape data may be either raster data expressing the shape of the crack by an image or vector data expressing the shape of the crack by numerical values. The shape of the crack is expressed by the length of the crack, the position of the crack, the width of the crack, the depth of the crack, or the like. The crack detector of road surface 106 detects cracks of the pavement, for example, on the basis of brightness information of the road surface. Here, cracks of the pavement are those of asphalt generated on the surface of the pavement.

Further, the crack detector of road surface 106 stores a crack-superposed image in which the ortho image and the detected crack shape data are superimposed in the inspection result data storage 108. The crack-superposed image stored in the inspection result data storage 108 may be that whose data amount has been compressed by a predetermined compression method.

Next, the crack rate calculator 107 is a calculator that calculates a crack rate on the basis of the crack shape data, the ortho image, and the position data acquired from the crack detector of road surface 106. The crack rate calculator 107 stores the calculated crack rate in the inspection result data storage 108.

Assuming meshes with each side 0.5 meters long on the road surface viewed from directly above, the crack rate is the area of pavement cracks calculated on the basis of the number of cracks present in each mesh. For example, the crack rate is calculated as 0.25 m$^2$ (100%) when there are two or more cracks in a mesh. Similarly, the crack rate is calculated as 0.15 m$^2$ (60%) when there is one crack in a mesh and calculated as 0 m$^2$ (0%) when there is no crack in a mesh. That is, the crack rate is expressed by the following equation.

Crack rate (%)=100×(area of cracks)/(area of section examined)

In the present embodiment, it is assumed that the crack rate calculator 107 sets meshes on the basis of the position data acquired from the position data acquirer 1022. The area of the section examined may be, for example, one mesh (0.25 m$^2$) or may be the area of the road surface over a predetermined road distance (for example, 13 meters, 100 meters, or the distance over all sections of the route). In the present embodiment, the case in which a crack rate of each mesh and an average crack rate of each section of the route (12.5 meters or 100 meters) are calculated will be described later as an example.

The crack rate calculator 107 stores the crack rate, the number of cracks, and the position data of each mesh used to calculate the crack rate in the inspection result data storage 108 as crack data.

The inspection result output unit 109 is an output unit that outputs the crack-superposed image stored in the inspection result data storage 108 to an external device of the crack analysis device of road surface 1. The external device is, for example, another computer system, a storage device for storing data in a recording medium, or the like (not shown). The inspection result output unit 109 outputs the crack-superposed image to the external device of the crack analysis device of road surface 1, for example, as a frame image or an ortho image. The frame image is an image of each frame of a captured image of the road surface when viewed obliquely. In the present embodiment, the captured image of the road surface is acquired by imaging an area behind the vehicle with the in-vehicle camera.

The inspection result output unit 109 outputs the crack data stored in the inspection result data storage 108 to the external device of the crack analysis device of road surface 1 in association with the crack-superposed image. By outputting the crack-superposed image and the crack data in association with each other, it is possible to display the crack-superposed image and the crack data in association with each other, for example, on another computer system. Display of the crack-superposed image and the crack data in association with each other is, for example, display of the crack-superposed image and the crack data such that the crack data is superimposed on the crack-superposed image or display thereof such that the crack-superposed image and the crack data are arranged in parallel.

In addition, the inspection result output unit 109 outputs the crack rate calculated by the crack rate calculator 107 and stored in the inspection result data storage 108. The inspection result output unit 109 outputs, for example, the crack rate of each mesh and the crack rate (the average of crack rates) calculated for each section of the route. It is to be noted that the inspection result output unit 109 may also output data on crack rates before being averaged, the maximum of the crack rates in a predetermined section, or the like instead of the average of the crack rates of each section of the route. The inspection result output unit 109 may also output the crack rate of a section corresponding to a crack-superposed image, together with the crack-superposed image.

Further, the inspection result output unit 109 outputs verification data. The verification data is data for verifying that the road surface for which the crack rate has been calculated is a correct inspection target. For example, when a start point and an end point of a route are designated such that the inspection target is a road surface from the start point to the end point, the verification data is data for verifying that pavement cracks were inspected for the entire road surface from the start point to the end point at a later date. For example, all captured images (frame images or ortho images) can be used as the verification data.

The timing at which the inspection result output unit 109 outputs the output information such as the crack-superposed image, the crack rate, or the verification data is arbitrary. The inspection result output unit 109 may output the output information, for example, when data on a crack-superimposed image or the like of a predetermined section is stored in the inspection result data storage 108. The inspection result output unit 109 also may output the output information on the basis of an explicit operation of a user.

The record creation/output unit 110 is an output unit that creates a predetermined record on the basis of the crack data stored in the inspection result data storage 108 and outputs the predetermined record to the outside of the crack analysis device of road surface 1 or to the display controller 111. The record creation/output unit 110 may also create a predetermined record including crack data and crack-superposed images. The record creation/output unit 110 outputs the created record as image data, although it may also output the created record as a text file in a predetermined file format. The record creation/output unit 110 also outputs the created record to the display controller 111.

Further, the record creation/output unit 110 can incorporate the verification data described above into the output record. By outputting the verification data as the record, it is possible to verify the inspection result of the output record. It is to be noted that the verification data may be used as billing data when providing a pavement crack detection service using the crack analysis device of road surface 1. For example, the verification data is used as billing data such that a fee obtained by multiplying a cumulative value of interframe distances or the number of frame images by a predetermined unit price is automatically calculated.

The display controller 111 is a display controller that generates screen data for display on the basis of the inspection result such as the crack-superposed image and the crack rate and causes the display 112 to display the screen data. The display controller 111 generates, for example, screen data including the crack-superposed image stored in the inspection result data storage 108 as an image for display.

From a plurality of crack-superimposed images of different capture dates and times, the display controller 111 generates screen data that enables comparison between the plurality of crack-superposed images of different capture dates and times. The plurality of crack-superimposed images to be compared are those which correspond to substantially the same position data and which are generated on the basis of images captured at the same capture positions (which may include some error). The screen data may include data using a geographic information system (GIS) (Geographic Information System data).

The display 112 is a display that displays screen data input from the display controller 111 on a screen. The display 112 is, for example, a liquid crystal display device. The screen data displayed may include, for example, map information such as that described later with reference to FIG. 9.

The output unit 113 is an output unit that outputs data stored in the inspection result data storage 108 to other devices.

The output unit 113 may be, for example, a web server that outputs requested data in response to a data acquisition request from another device. The data output from the output unit 113 is data stored in the inspection result data storage 108, which is, for example, a captured image converted into an ortho image, a crack-superposed image, crack shape data (raster data or vector data indicating the shape of cracks), or crack data (the crack rate, the number of cracks, etc.). The type of data output from the output unit 113 may be determined according to a request from another device. The output unit 113 may also have a function of receiving data from another device.

It is to be noted that the data output from the output unit 113 may also be output from the inspection result output unit 109 to a recording medium. For example, data stored in the inspection result data storage 108 can be provided to another device which is not able to acquire data from the output unit 113 via the network 3 through a recording medium rather than causing the other device to acquire the data from the output unit 113. The recording medium is, for example, a hard disk drive, a memory card, or an optical disk. The output unit 113 has a recording unit for the recording medium (not shown).

Next, the operation of the first embodiment will be described.

Figure 3:
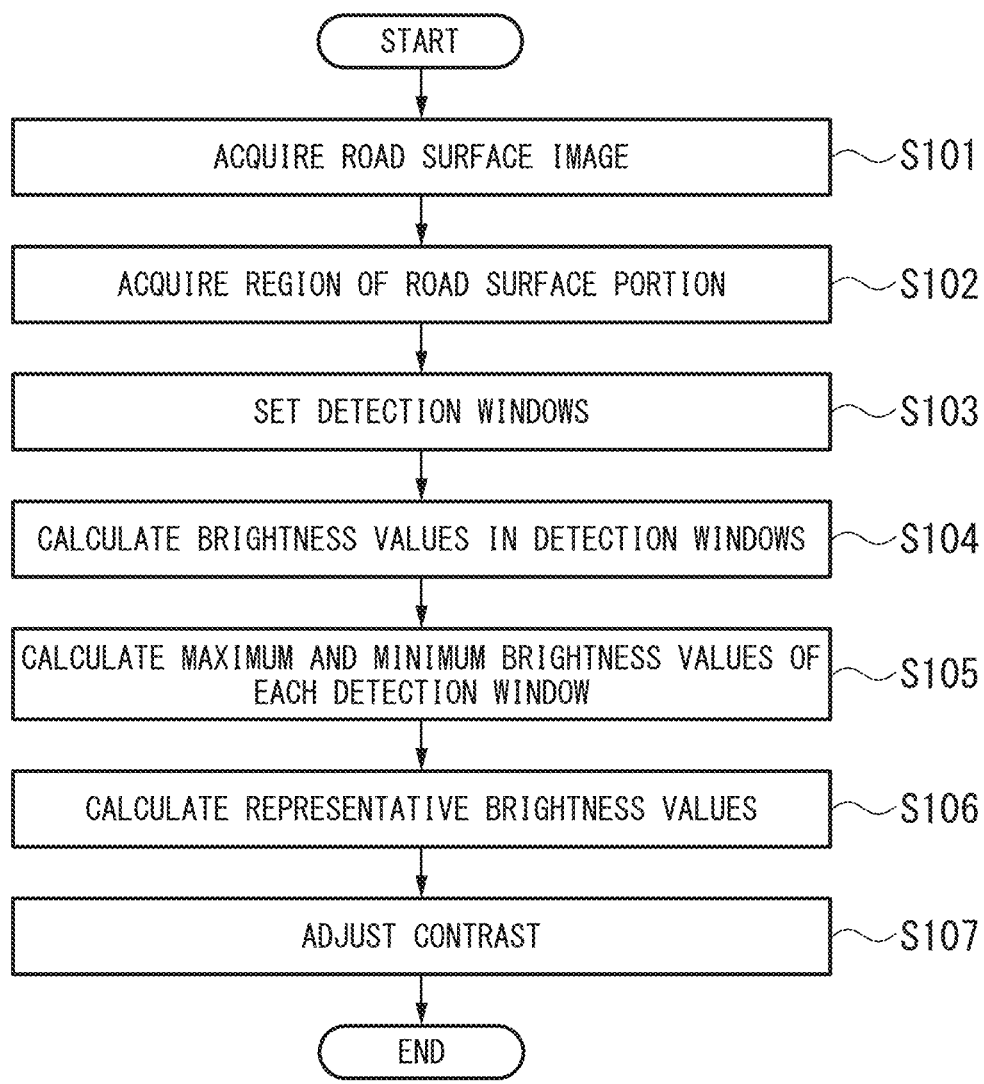
FIG. 3 is a flowchart showing a process flow of an image feature emphasis device.

FIG. 3 is a flowchart showing a process flow of the image feature emphasis device 10 of the present embodiment.

It is assumed that a road surface image has already been stored in the image data storage 13 at the start of the processing of FIG. 3.

First, the region acquirer 14 acquires the road surface image stored in the image data storage 13 (step S101). Here, the image acquired may be the latest road surface image acquired from the image data storage 13 or may be a road surface image stored in the image data storage 13 which is the earliest in chronological order or may also be a road surface image selected by the user.

Figure 4:
FIG. 4 is a diagram showing an example of a road surface image.

FIG. 4 is a diagram showing an example of the road surface image.

Many objects 270 (for example, a bus, a vehicle, a person, or a tree), in addition to a road surface 260, are imaged in a road surface image 250 shown in FIG. 4. In particular, in the road surface image 250 of FIG. 4, objects 270 such as trees and a bus clearly appear due to the sunlight and an automatic adjustment function of the camera. On the other hand, the portion of the road surface 260 is imaged with blur, which may sometimes lower crack detection precision.

Next, from the acquired road surface image, the region acquirer 14 identifies objects 270 (for example, moving objects such as a vehicle and a bus, a person, a building, a tree) imaged in the road surface image (step S102). An existing technique may be used as a method of identifying the objects 270. For example, when a moving object such as a vehicle or a bus can be identified as an object 270, the region acquirer 14 identifies a vertical direction from the positions of tires of the moving object and detects a portion which is below the vehicle and whose pixel values are similar to those of a road surface registered in advance (a portion over which color close to gray is spread) as the road surface.

Next, with reference to the detected pixels of the road surface portion, the region acquirer 14 searches for a portion whose pixel values are similar to those of the detected pixels of the road surface portion in the road surface image and detects a region(s) obtained from the search result as a region(s) of the road surface portion. The region acquirer 14 then acquires the detected region of the road surface portion from the road surface image to generate a partial region image. The region acquirer 14 may also acquire the region of the road surface portion by applying (superimposing) a mask region (a mask image) created in advance for each combination of the type of the camera, the height thereof at the time of imaging the road surface, and the direction thereof at the time of imaging the road surface to (on) the road surface image to generate the partial region image. The mask image is an image having the same size as the road surface image.

The mask image is, for example, an image having pixel values of, for example, "1" for pixels in the region of the road surface portion and "0" for pixels in regions other than the road surface portion. The region acquirer 14 superimposes the mask image on the road surface image and acquires a region in which the pixels of the mask image are "1" from the road surface image as the region of the road surface portion.

Figure 5:
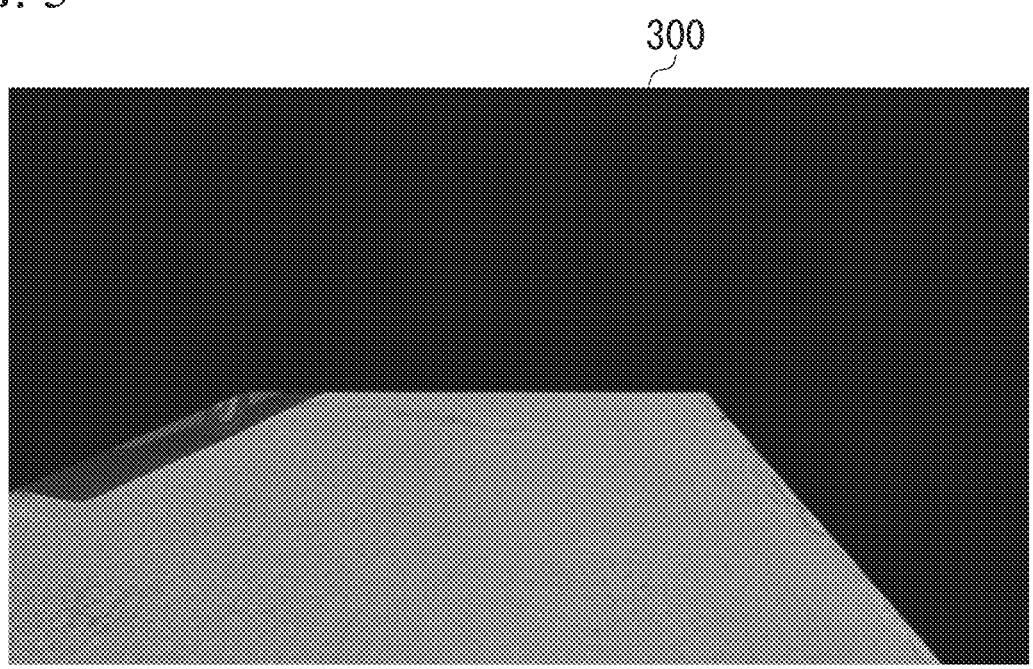
FIG. 5 is a diagram showing an example of a partial region image.

FIG. 5 is a diagram showing an example of the partial region image.

As shown in FIG. 5, a region of a road surface portion is extracted, while no regions other than the region of the road surface portion are drawn in a partial region image 300 by a mask image. The region acquirer 14 outputs the generated partial region image to the image feature emphasis processor 15.

Next, the image feature emphasis processor 15 sets a plurality of detection windows in the region of the road surface portion in the acquired partial region image (step S103). The positions and sizes of the detection windows may be preset for each mask image or may be set by the user.

Since the road surface image input to the image feature emphasis device 10 is a full high definition (HD) monochrome image, the number of horizontal pixels is 1920 pixels, the number of vertical pixels is 1080 pixels, and each pixel has an 8-bit gradation of 0 to 255. Let each pixel be P(v, h). Here, v represents the vertical position from 0 to 1079 of the image and h represents the horizontal position from 0 to 1919 of the image. Let Y(v, h) be the brightness value of each pixel.

Figure 6:
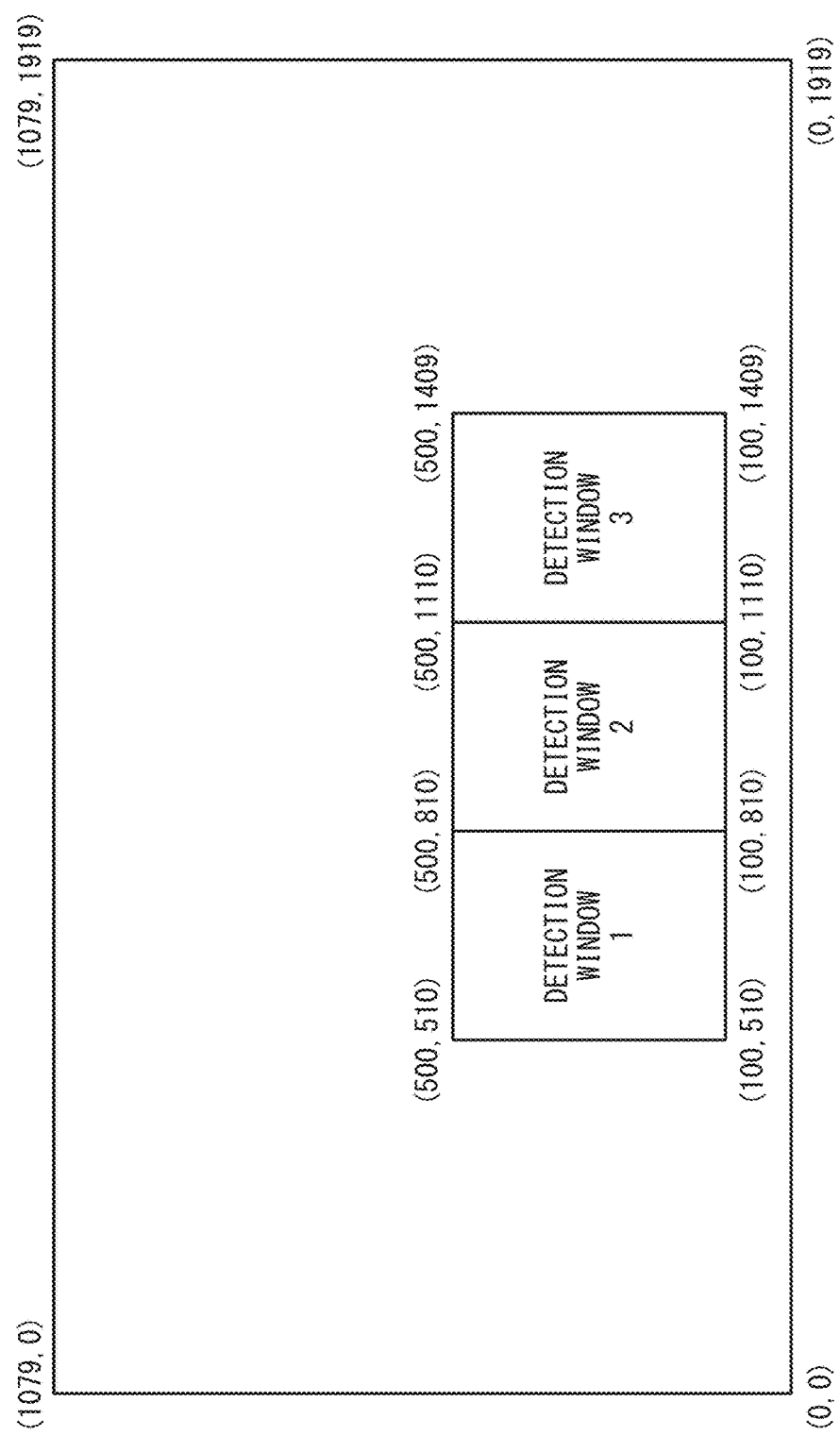
FIG. 6 is a diagram showing exemplary detection windows.

FIG. 6 is a diagram showing exemplary detection windows.

FIG. 6 shows a case in which a plurality of detection windows, detection window 1, detection window 2, and detection window 3, are set in a range where a main road surface portion especially appears in the road surface image. The positions of the detection windows are P(100, 510) to P(499, 809) for the detection window 1, P(100, 810) to P(499, 1109) for the detection window 2, and P(100, 1110) to P(499, 1409) for the detection window 3. The shape of each of the detection windows is not limited to a rectangle as shown in FIG. 6, and may be a square, a trapezoid, or a polygon. The size and arrangement of the detection windows can be changed depending on the road surface image.

Figure 7:
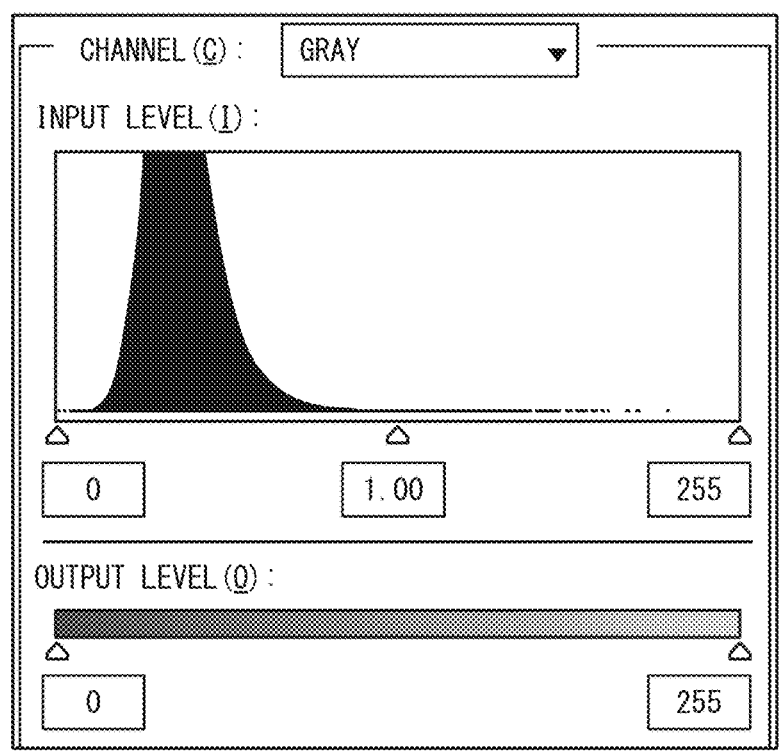
FIG. 7 is a diagram showing a distribution of brightness values in a detection window.
Figure 8:
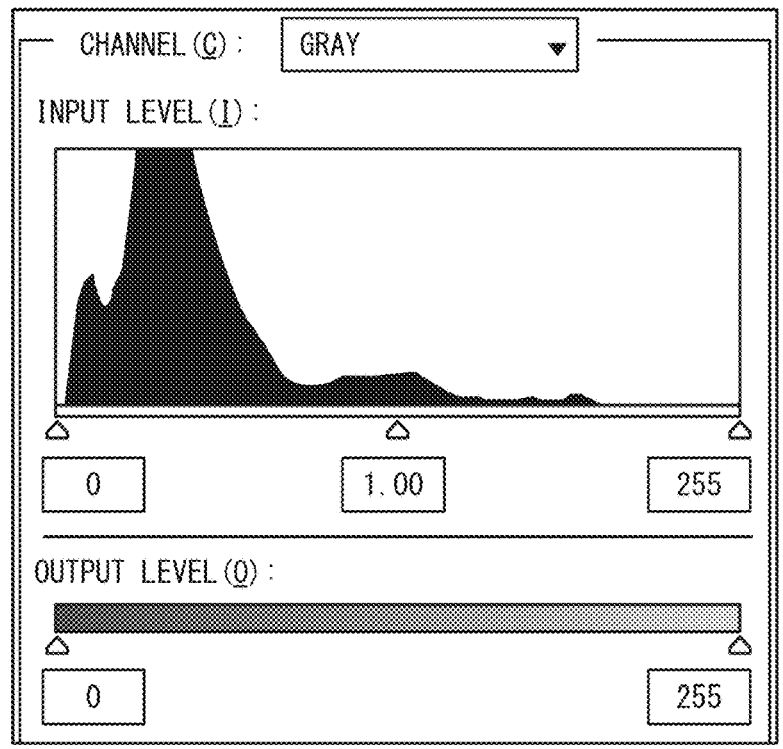
FIG. 8 is a diagram showing a distribution of brightness values in a road surface image.

In general, the distribution of brightness values Y(v, h) in the detection window does not spread from 0 to 255 as shown in FIG. 7 and is fixed to a constant value. This is because the road surface has a specific brightness. On the contrary, the entire road surface image including regions other than the region of the road surface portion has a wider range of brightness values than only in the detection window as shown in FIG. 8.

Next, the image feature emphasis processor 15 calculates brightness values in the set detection window (step S104). Specifically, for a pixel in spatial directions of v and h in the detection window, the image feature emphasis processor 15 calculates a brightness value to which a low pass filter (LPF) is applied through the following computation. When the brightness value before the LPF is Y(v, h) and the brightness value after the LPF is Y9(v, h), the brightness value Y9(v, h) after the LPF is expressed by the following equation (1).

$$Y9(v,h)=(Y(v-1,h-1)+Y(v-1,h)+Y(v-1,h+1)+Y(v,h-1)+Y(v,h)+Y(v,h+1)+Y(v+1,h-1)+Y(v+1,h)+Y(v+1,h+1))/9 \quad (1)$$

Figure 9:
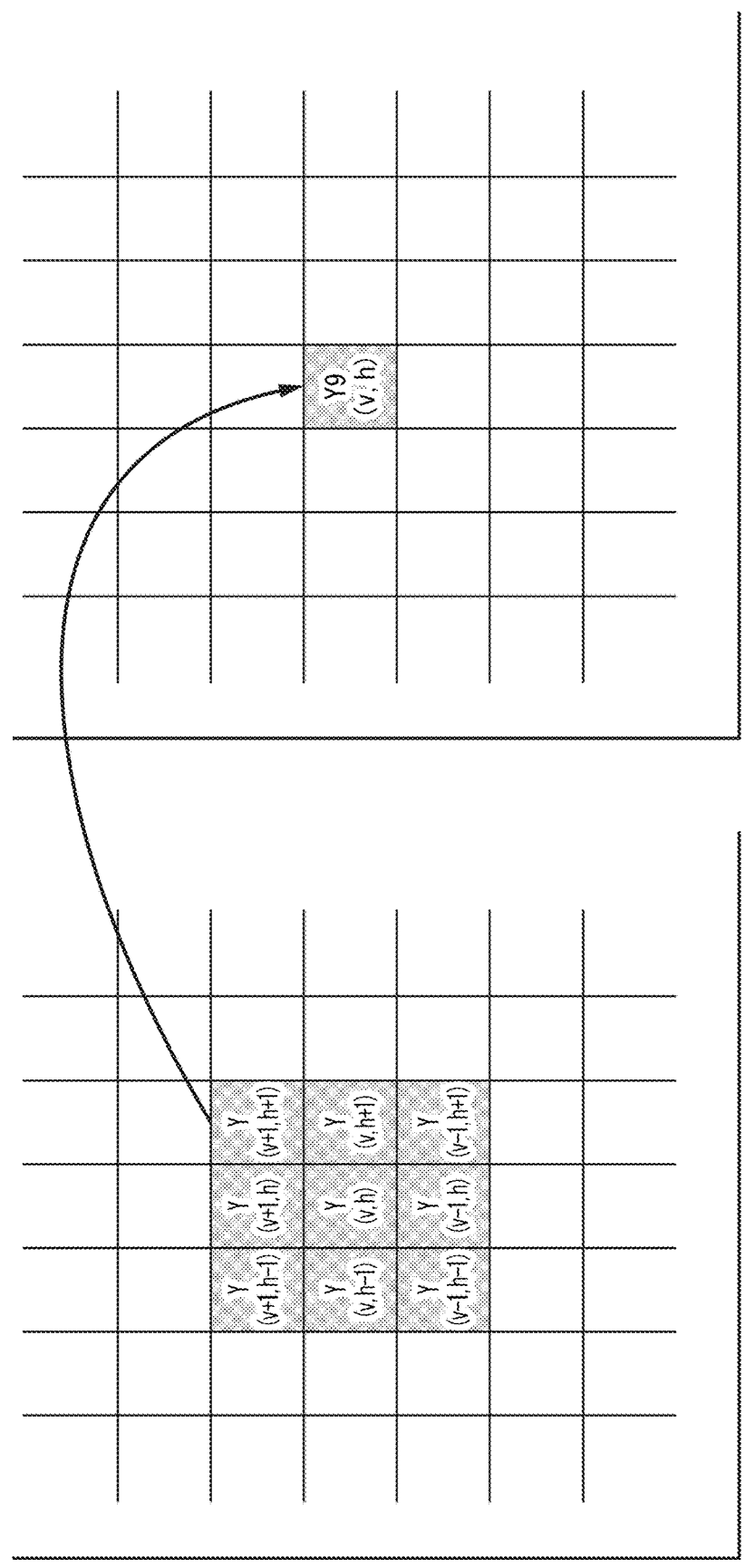
FIG. 9 is a diagram showing an example of an LPF used in the present embodiment.

FIG. 9 shows a positional relationship of pixels handled in the LPF.

That is, FIG. 9 is a diagram showing an example of the LPF used in the present embodiment. In the present embodiment, averaging of the brightness values of 9 pixels which are a target pixel for calculating the brightness value and 8 pixels adjacent to the target pixel is applied as an LPF as shown in FIG. 9. This alleviates the influence of sudden defective values of pixels in units of one pixel. The image feature emphasis processor 15 may also use a 9-pixel median filter or the like instead of the 9-pixel LPF. The image feature emphasis processor 15 performs this processing for each pixel in the detection window, thereby calculating the brightness values in the detection window.

Figure 10:
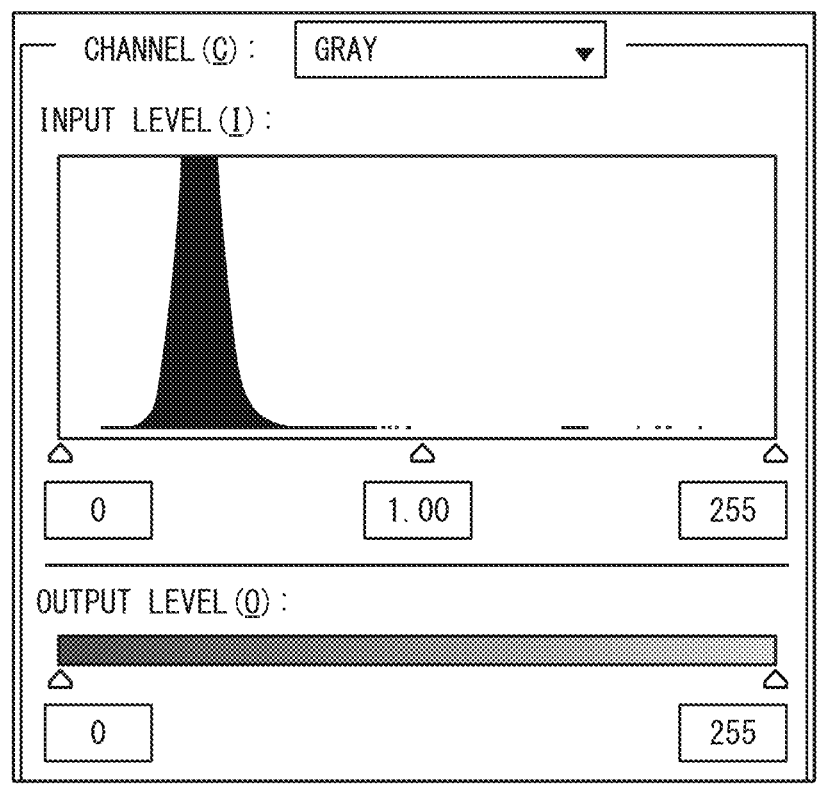
FIG. 10 is a diagram showing a brightness distribution after the LPF.

FIG. 10 is a diagram showing a brightness distribution after the LPF. As shown in FIG. 10, it can be seen that noise is reduced and the brightness distribution becomes narrower than those of FIG. 7 and FIG. 8 before the LPF is applied.

Returning to FIG. 3, the image feature emphasis processor 15 calculates a maximum brightness value and a minimum brightness value for each detection window (step S105). Here, when the maximum brightness value of the detection window 1 is W1Ymax and the minimum brightness value is W1Ymin, the maximum brightness value W1Ymax and the minimum brightness value W1Ymin of the detection window 1 are expressed by the following equation (2).

$$W1Ymax=\max(Y9(100,510),Y9(100,511),Y9(100,512),\ldots,Y9(499,807),Y9(499,808),Y9(499,809))$$

$$W1Ymin=\min(Y9(100,510),Y9(100,510),Y9(100,512),\ldots,Y9(499,807),Y9(499,808),Y9(499,809)) \quad (2)$$

Similar to the detection window 1, when the maximum brightness value of the detection window 2 is W2Ymax, the minimum brightness value thereof is W2Ymin, the maximum brightness value of the detection window 3 is W3Ymax, and the minimum brightness value thereof is W3Ymin, the maximum and minimum brightness values W2Ymax and W2Ymin of the detection window 2 and the maximum and minimum brightness values W3Ymax and W3Ymin of the detection window 3 are expressed by the following equations (3) and (4), respectively.

$$W2Ymax=\max(Y9(100,810),Y9(100,811),Y9(100,812),\ldots,Y9(499,1107),Y9(499,1108),Y9(499,1109))$$

$$W2Ymin=\min(Y9(100,810),Y9(100,811),Y9(100,812),\ldots,Y9(499,1107),Y9(499,1108),Y9(499,1109)) \quad (3)$$

$$W3Ymax=\max(Y9(100,1110),Y9(100,1111),Y9(100,1112),\ldots,Y9(499,1407),Y9(499,1408),Y9(499,1407))$$

$$W3Ymin=\min(Y9(100,1110),Y9(100,1111),Y9(100,1112),\ldots,Y9(499,1407),Y9(499,1408),Y9(499,1409)) \quad (4)$$

The image feature emphasis processor 15 calculates the maximum brightness value and the minimum brightness value of each detection window according to the above equations (2) to (4). Thus, information on the range of brightness values in each detection window is obtained. Next, the image feature emphasis processor 15 calculates representative brightness values of all detection windows using the calculated maximum and minimum brightness values in each detection window (step S106). Here, when the maximum representative brightness value is Ymax and the minimum representative brightness value is Ymin, the maximum and minimum representative brightness values Ymax and Ymin are expressed by the following equation (5).

$$Ymax=\mathrm{median}(W1Ymax,W2Ymax,W3Ymax)$$

$$Ymin=\mathrm{median}(W1Ymin,W2Ymin,W3Ymin) \quad (5)$$

By the above equation (5), information on the range of brightness values of the region of the road surface portion is obtained. The image feature emphasis processor 15 performs contrast adjustment on the entire partial region image by using the maximum representative brightness value Ymax and the minimum representative brightness value Ymin obtained by equation (5) (step S107). Specifically, the image feature emphasis processor 15 performs contrast adjustment by changing the range of brightness values to a range from the minimum representative brightness value Ymin to the maximum representative brightness value Ymax. Thereby, an emphasized image is generated.

FIG. 11 is a diagram showing details of contrast adjustment. As shown in FIG. 11, the range of brightness values is wide before contrast adjustment, but the range of brightness values is adjusted to a range from the minimum representative brightness value Ymin to the maximum representative brightness value Ymax after contrast adjustment.

Then, the image feature emphasis processor 15 enhances the contrast by increasing the change of brightness from the minimum representative brightness value Ymin to the maximum representative brightness value Ymax for the partial region image to a change from 0 to 255. Thereby, features of the region of the road surface portion in the road surface image are easily recognized.

Figure 12:
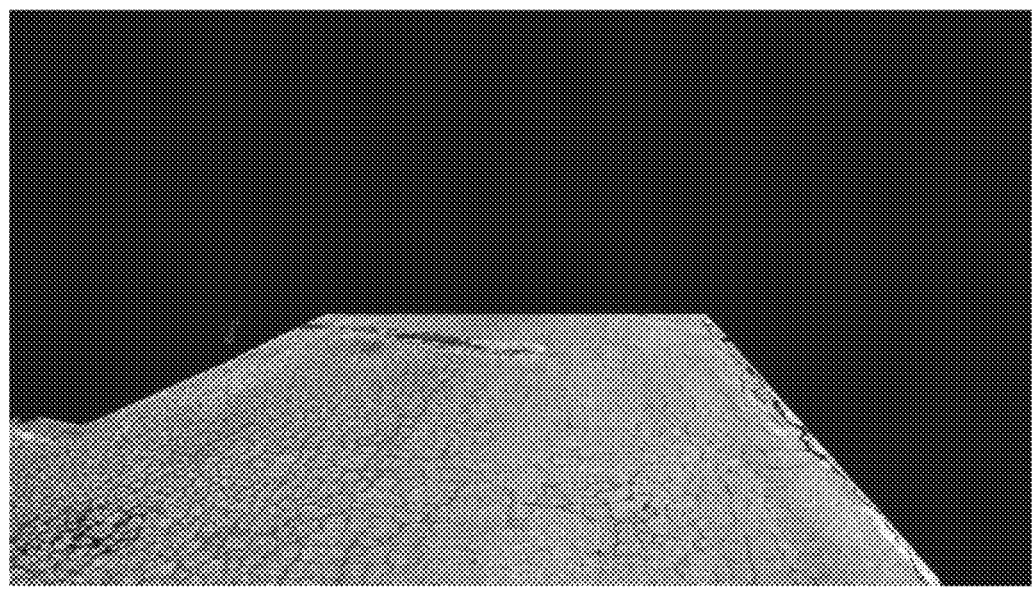
FIG. 12 is a diagram showing a state of a region of a road surface portion after contrast enhancement.

FIG. 12 is a diagram showing a state of the region of the road surface portion after contrast enhancement. As shown in FIG. 12, cracks in the region of the road surface portion are emphasized as compared to the road surface image of FIG. 4.

According to the image feature emphasis device 10 configured as described above, the region of the road surface portion is acquired from the road surface image, and emphasis processing is performed on the acquired region of the road surface portion. The range of brightness values used in a road surface image in which regions other than a region of a road surface portion (for example, regions where objects or the like are imaged) are imaged is wide. Therefore, even if emphasis processing is performed, features of the region of the road surface portion are hardly emphasized. On the other hand, the range of brightness values in the region of the road surface portion is narrower than that of the entire road surface image. Therefore, by emphasizing the region of the road surface portion, features of the region of the road surface portion are emphasized. This makes it possible to improve the accuracy of detection of features of the road surface in the road surface image. As a result, it is possible to accurately detect the features of the image.

Further, the image feature emphasis device 10 performs contrast adjustment using the maximum representative brightness value and the minimum representative brightness value obtained on the basis of the maximum brightness values and the minimum brightness values in the region of the road surface portion. Then, the image feature emphasis device 10 increases the change of brightness between the maximum representative brightness value and the minimum representative brightness value to change brightness values in the region of the road surface portion, thereby emphasizing the features. This allows the image feature emphasis device 10 to perform emphasis processing without being affected by the brightness values of regions other than the region of the road surface portion. Therefore, it is possible to improve the accuracy of detection of features of the road surface portion in the road surface image.

The image feature emphasis device 10 sets a plurality of detection windows for the region of the road surface portion, calculates maximum brightness values and minimum brightness values in the detection windows, calculates a maximum representative brightness value and a minimum representative brightness value using the calculated maximum and minimum brightness values, and emphasizes features of the image by changing brightness values in the region of the road surface portion on the basis of the calculated maximum and minimum representative brightness values. When calculating the maximum representative brightness value and the minimum representative brightness value, the image feature emphasis device 10 calculates respective median values of the maximum brightness values and the minimum brightness values of the detection windows as the maximum and minimum representative brightness values. Thereby, even if a part of an irregular state (object) is included in any of a plurality of detection windows, this can be avoided by taking such median values of a plurality of detection windows.

Modification of First Embodiment

A modification of the first embodiment will be described below.

In the method of acquiring the region of the road surface portion in step S101 in FIG. 3, the region of the road surface portion is acquired automatically from the positional relationship of detected objects or the like. However, the region acquirer 14 in FIG. 2 may also acquire a region selected by the user as a region of the road surface portion. In the case of this configuration, for example, the image feature emphasis device 10 displays a setting screen for the road surface portion on a display (not shown) and the user selects a specific region within the road surface image using an input device such as a mouse. The region acquirer 14 acquires the selected specific region as a region of the road surface portion.

In another modification, in step S105 of FIG. 3, the image feature emphasis processor 15 may exclude values of the 1st to 10000th pixels in decreasing order of the pixel brightness and the 1st to 10000th pixels in increasing order thereof as defective values in the detection windows and calculate the maximum and minimum brightness values among those remaining after exclusion rather than simply taking the maximum and minimum of all brightness values in the detection windows as the maximum brightness values (W1Ymax, W2Ymax, W3Ymax) and the minimum brightness values (W1Ymin, W2Ymin, W3Ymin).

In the processing of step S104 in FIG. 3, an LPF is applied when calculating the brightness values in the detection windows in the configuration shown above. However, in further another modification, this processing is not necessarily performed. When no LPF is applied, the image feature emphasis processor 15 uses the pixel values of pixels in each detection window directly as pixel values in the detection window.

The image feature emphasis processor 15 may also be configured such that, when a detection window in which a representative brightness value is an outlier is present among all detection windows, the image feature emphasis processor 15 calculates the maximum representative brightness value and the minimum representative brightness value using brightness values in detection windows excluding the detection window having the outlier. Here, the representative brightness value is a representative of the brightness values in the single detection window. The image feature emphasis processor 15 calculates the median of all pixel values in the single detection window as a representative brightness value. The outlier is a representative brightness value which is greatly deviated from the representative brightness values of the other detection windows. For example, the outlier may be obtained using a method such as testing.

With such a configuration, it is possible to exclude regions of the road surface portion where brightness values have changed due to the influence of buildings, vehicles, shadows, or the like. Therefore, it is possible to suppress a reduction in the accuracy of emphasis processing.

In still another modification, the image feature emphasis processor 15 may be configured such that, when road surface images are continuously input in chronological order like moving images, the image feature emphasis processor 15 calculates the maximum representative brightness value and the minimum representative brightness value using brightness values in detection windows excluding a detection window in which a change in the representative brightness value is equal to or greater than a threshold value.

With such a configuration, it is possible to exclude regions of the road surface portion where brightness values have changed due to the influence of buildings, vehicles, shadows, or the like. Therefore, it is possible to suppress a reduction in the accuracy of emphasis processing.

Second Embodiment

The second embodiment is an embodiment in which, rather than performing emphasis processing on a road surface image in advance, crack analysis is performed after a road surface region is extracted and emphasis processing is performed in the crack analysis device of road surface 1.

Figure 13:
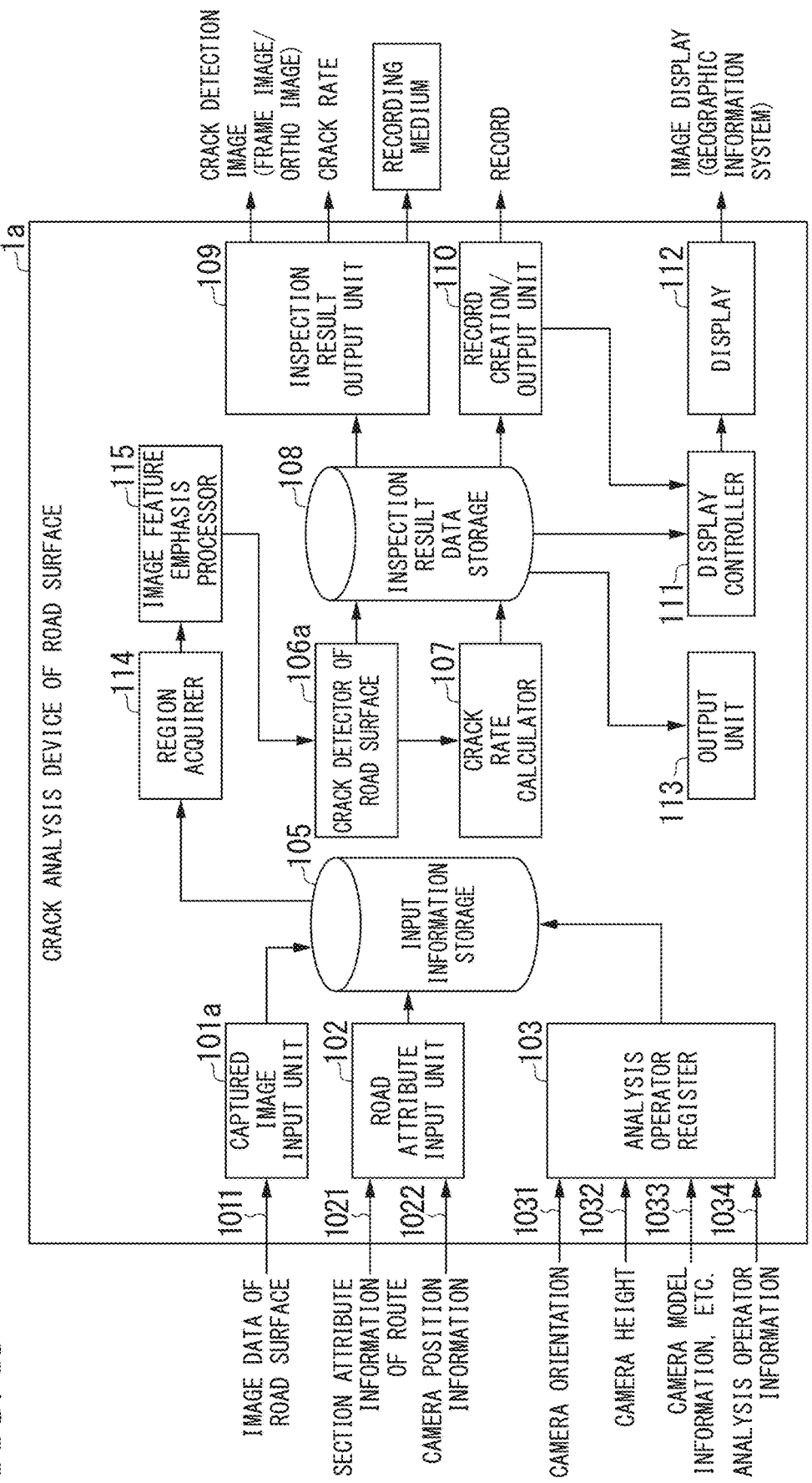
FIG. 13 is a schematic block diagram showing the functional configuration of each device in a second embodiment.

In the second embodiment, the road maintenance management system 100 includes a crack analysis device of road surface 1a shown in FIG. 13.

FIG. 13 is a schematic block diagram showing the crack analysis device of road surface 1a in the second embodiment. In FIG. 13, the same components as those of the crack analysis device of road surface 1 shown in FIG. 2 are denoted by the same reference signs and descriptions thereof will be omitted.

The configuration of the crack analysis device of road surface 1a will now be described. The configuration of the crack analysis device of road surface 1a differs from that of the crack analysis device of road surface 1 in that the crack analysis device of road surface 1a includes a captured image input unit 101a and a crack detector of road surface 106a instead of the captured image input unit 101 and the crack detector of road surface 106 and includes a region acquirer 114 and an image feature emphasis processor 115 as new components. Only the differences will be described below.

The captured image input unit 101a is an input unit for acquiring a road surface image obtained through the in-vehicle camera. Connection between the captured image acquirer 1011 and the in-vehicle camera may be either wired or wireless. Further, data on the road surface image that is input to the captured image input unit 101a may be data currently captured by the in-vehicle camera. The data on the road surface image that is input to the captured image input unit 101a may also be data on a captured image which was captured and recorded by the in-vehicle camera in the past.

The region acquirer 114 is a region acquirer that generates a partial region image by acquiring a region of a road surface portion from the road surface image stored in the input information storage 105. The specific processing of the region acquirer 114 is similar to that of the region acquirer 14.

The image feature emphasis processor 115 is a processing unit that performs a process of emphasizing the features of the region of the road surface portion in the partial region image acquired by the region acquirer 114. The specific processing of the image feature emphasis processor 115 is similar to that of the image feature emphasis processor 15.

Here, the captured image input unit 101a, the road attribute input unit 102, the input information storage 105, the region acquirer 114 and the image feature emphasis processor 115 are configured as an image feature emphasis device.

It is to be noted that the image feature emphasis device may include at least the region acquirer 114 and the image feature emphasis processor 115.

The crack detector of road surface 106a is a feature detector that detects features of a road surface from the region of the road surface portion in the emphasized image generated by the image feature emphasis processor 115 through image processing. The specific processing of the crack detector of road surface 106a is similar to that of the crack detector of road surface 106.

According to the crack analysis device of road surface 1a configured as described above, it is possible to achieve the same advantages as those of the image feature emphasis device 10 in the first embodiment.

Further, the crack analysis device of road surface 1a can perform emphasis processing and crack analysis on images with the single device. This can improve convenience.

Modifications of Second Embodiment

Modifications of the present embodiment are described below.

the crack analysis device of road surface 1a according to the present embodiment may be modified similar to the image feature emphasis device 10 of the first embodiment.

Modifications Common to Embodiments

Modifications common to the above embodiments will be described below.

In each of the above embodiments, the shape of cracks may include that indicating the direction of a crack. The direction of a crack is, for example, an angle with respect to the traveling direction of the vehicle. The angle with respect to the traveling direction of the vehicle may be expressed in a range from −90 to +90 degrees with the traveling direction of the vehicle being 0 degrees. The direction of a crack may also be a straight-line approximation of a crack of a predetermined length. The shape of cracks may be that indicating a straight-line shape, a curved-line shape, a branch-like shape in which a plurality of straight lines or a curve branches, a shape such as a polygon formed due to cracks (referred to as a "tortoise shape" in this modification, but not limited to a hexagonal shape).

In the above embodiments, the crack analysis device of road surface 1 and the crack analysis device of road surface 1a are configured such that they detect pavement cracks in a road surface as features in an emphasized image through image processing. However, the crack analysis device of road surface 1 and the crack analysis device of road surface 1a may also be configured such that they detect potholes, depressions, scratches in white lines and road markings, falling objects, animal carcasses, defects in roads such as water leaks, repair marks, people, or vehicles as features in an emphasized image.

According to at least one of the embodiments described above, the region acquirer 14 that acquires a region of a road surface portion from a road surface image and the image feature emphasis processor 15 that performs a process of emphasizing image features in the acquired region of the road surface portion are provided, whereby it is possible to improve the accuracy of detection of features of the road surface in the road surface image.

While some embodiments of the present invention have been described, these embodiments have been presented by way of example and are not intended to limit the scope of the invention. These embodiments can be implemented in various other forms, and various omissions, substitutions, and changes can be made without departing from the spirit of the invention. These embodiments and modifications thereof are included in the scope or spirit of the invention, as well as in the scope of the invention described in the claims and their equivalents.

What is claimed is:

1. An image feature emphasis device comprising:
an image input unit configured to input a road surface image in which a road surface is imaged;
an image data storage configured to store the road surface image input by the image input unit;
a road surface region extraction unit configured to identify an object imaged in the road surface image stored in the image data storage and to acquire a region, in which a pixel value of a pixel around the identified object is similar to the pixel value of the road surface, as a road surface region;
an image feature emphasis processor configured to emphasize a feature of the acquired road surface region by changing brightness values in the road surface region on the basis of a maximum brightness value and a minimum brightness value in the road surface region; and
an image output unit configured to output an emphasized image in which the characteristics of the road surface region are emphasized by the image feature emphasis processor.

2. The image feature emphasis device according to claim 1, wherein the image feature emphasis processor is configured to set a plurality of detection windows for the road surface region, calculate respective maximum and minimum brightness values of the detection windows, calculate a maximum representative brightness value and a minimum representative brightness value of all the detection windows using the calculated maximum and minimum brightness values, and emphasize a feature of the road surface region by changing brightness values in the road surface region on the basis of the calculated maximum and minimum representative brightness values.

3. The image feature emphasis device according to claim 2, wherein the image feature emphasis processor is configured to calculate, when a detection window in which a representative brightness value is an outlier is present among all the detection windows, a maximum representative brightness value and a minimum representative brightness value using brightness values in at least one of the detection windows excluding the detection window having the outlier.

4. The image feature emphasis device according to claim 2, wherein the image feature emphasis processor is configured to calculate, when road surface images are continuously input, a maximum representative brightness value and a minimum representative brightness value using brightness values in at least one of the detection windows excluding a detection window in which a change in a representative brightness value is equal to or greater than a threshold value.

5. A road surface feature analysis device comprising:
an image input unit configured to input a road surface image in which a road surface is imaged;
an image data storage configured to store the road surface image input by the image input unit;

a road surface region extraction unit acquirer configured to identify an object imaged in the road surface image stored in the image data storage and to acquire a region, in which a pixel value of a pixel around the identified object is similar to the pixel value of the road surface, as a road surface region;

an image feature emphasis processor configured to emphasize a feature of the acquired the road surface region by changing brightness values in the road surface region on the basis of a maximum brightness value and a minimum brightness value in the road surface region;

a road surface feature detector configured to acquire an emphasized image in which the characteristics of the road surface region are emphasized by the image feature emphasis processor and detects deterioration of the road surface by image processing from road surface region in the acquired emphasized image; and an inspection result output unit configured to output an inspection result according to the deterioration of the road surface detected by the road surface feature detector.

6. The road surface feature analysis device according to claim 5, wherein the road surface feature detector is configured to detect a pavement crack of a road surface from the road surface region within the emphasized image, in which a feature of the road surface region is emphasized, through image processing.

7. An image feature emphasis method comprising:
an image input process including inputting a road surface image in which a road surface is imaged;
an image data recording process including recording the road surface image input by the image input process an image data storage;
a road surface region extraction process including identifying an object imaged in the road surface image stored in the image data storage and to acquire a region, in which a pixel value of a pixel around the identified object is similar to the pixel value of the road surface, as a road surface region;
an image feature emphasis processing process including emphasizing a feature of the acquired road surface region by changing brightness values in the road surface region on the basis of a maximum brightness value and a minimum brightness value in the road surface region; and
an image output process including outputting an emphasized image in which the characteristics of the road surface region are emphasized by the image feature emphasis processing process.

8. The image feature emphasis method according to claim 7, wherein the image feature emphasis processing process includes setting a plurality of detection windows for the road surface region, calculating respective maximum and minimum brightness values of the detection windows, calculating a maximum representative brightness value and a minimum representative brightness value of all the detection windows using the calculated maximum and minimum brightness values, and emphasizing a feature of the road surface region by changing brightness values in the road surface region on the basis of the calculated maximum and minimum representative brightness values.

9. The image feature emphasis method according to claim 8, wherein the image feature emphasis processing process includes calculating, when a detection window in which a representative brightness value is an outlier is present among all the detection windows, a maximum representative brightness value and a minimum representative brightness value using brightness values in at least one of the detection windows excluding the detection window having the outlier.

10. The image feature emphasis method according to claim 8, wherein the image feature emphasis processing process includes calculating, when road surface images are continuously input, a maximum representative brightness value and a minimum representative brightness value using brightness values in at least one of the detection windows excluding a detection window in which a change in a representative brightness value is equal to or greater than a threshold value.

11. A road surface feature analysis method comprising:
an image input process including inputting a road surface image in which a road surface is imaged;
an image data recording process including recording the road surface image input by the image input process an image data storage;
a road surface region extraction process including identifying an object imaged in the road surface image stored in the image data storage and to acquire a region, in which a pixel value of a pixel around the identified object is similar to the pixel value of the road surface, as a road surface region;
an image feature emphasis processing process including emphasizing a feature of the acquired the road surface region by changing brightness values in the road surface region on the basis of a maximum brightness value and a minimum brightness value in the road surface region;
a road surface feature detecting process including acquiring an emphasized image in which the characteristics of the road surface region are emphasized by the image feature emphasis processor and detects deterioration of the road surface by image processing from road surface region in the acquired emphasized image; and
an inspection result output process including outputting an inspection result according to the deterioration of the road surface detected by the road surface feature detecting process.

12. The road surface feature analysis method according to claim 11, wherein the road surface feature detecting process includes detecting a pavement crack of a road surface from the road surface region within the emphasized image, in which a feature of the road surface region is emphasized, through image processing.

13. The image feature emphasis device according to claim 1, the road surface region extraction unit identifies moving objects from the road surface image and identifies a vertical direction from the positions of tires of the moving objects, and acquires a region, in which below the moving objects and whose pixel values are similar to the pixel value of the road surface registered in advance, as the road surface region.

14. The image feature emphasis device according to claim 1, further comprising:
a setting display configured to set the road surface region, the road surface region extraction unit acquires a region specified by an user in the setting display, as the road surface region.

* * * * *